United States Patent [19]

Sakai

[11] 3,756,565

[45] Sept. 4, 1973

[54] PULLEY BLOCK WITH BRAKE

[75] Inventor: Hideo Sakai, Tokyo, Japan

[73] Assignee: Tomy Kabushiki Kaisha, Tokyo-to, Japan

[22] Filed: Oct. 22, 1971

[21] Appl. No.: 191,592

[30] Foreign Application Priority Data

Nov. 24, 1970 Japan ..... 45/115790 (utility model)

[52] U.S. Cl. ............ 254/192, 24/132 VB, 188/82.8, 188/65.1
[51] Int. Cl. .............................................. B66d 1/36
[58] Field of Search................... 254/191, 192, 155, 254/156; 188/65.1, 82.3, 82.8; 114/218; 24/132 VB, 132 WL

[56] References Cited
UNITED STATES PATENTS

| 152,270 | 6/1874 | Bird | 254/192 |
| 2,066,094 | 12/1936 | Crawford | 188/65.1 |
| 2,955,560 | 10/1960 | Howington et al. | 254/191 |

Primary Examiner—Evon C. Blunk
Assistant Examiner—Merle F. Maffei
Attorney—Steinberg & Blake

[57] ABSTRACT

A pulley block having a brake structure which, if necessary, can be manually released. A supporting structure carries a pin on which a pulley is rotatable. The pulley has an outer periphery at least one portion of which is at a greater radial distance from the pin than other portions of the outer periphery of the pulley. An elongated flexible member such as a rope or cable is guided around the pulley to participate in the hoisting of a load. A wedge structure is carried by the supporting structure to cooperate with the pulley, and in particular the latter one portion of its outer periphery, for automatically gripping the flexible member when the load is released, and a manually operable structure is available to be used, if necessary, for releasing the flexible member from wedging engagement between the pulley and the wedge structure.

10 Claims, 5 Drawing Figures

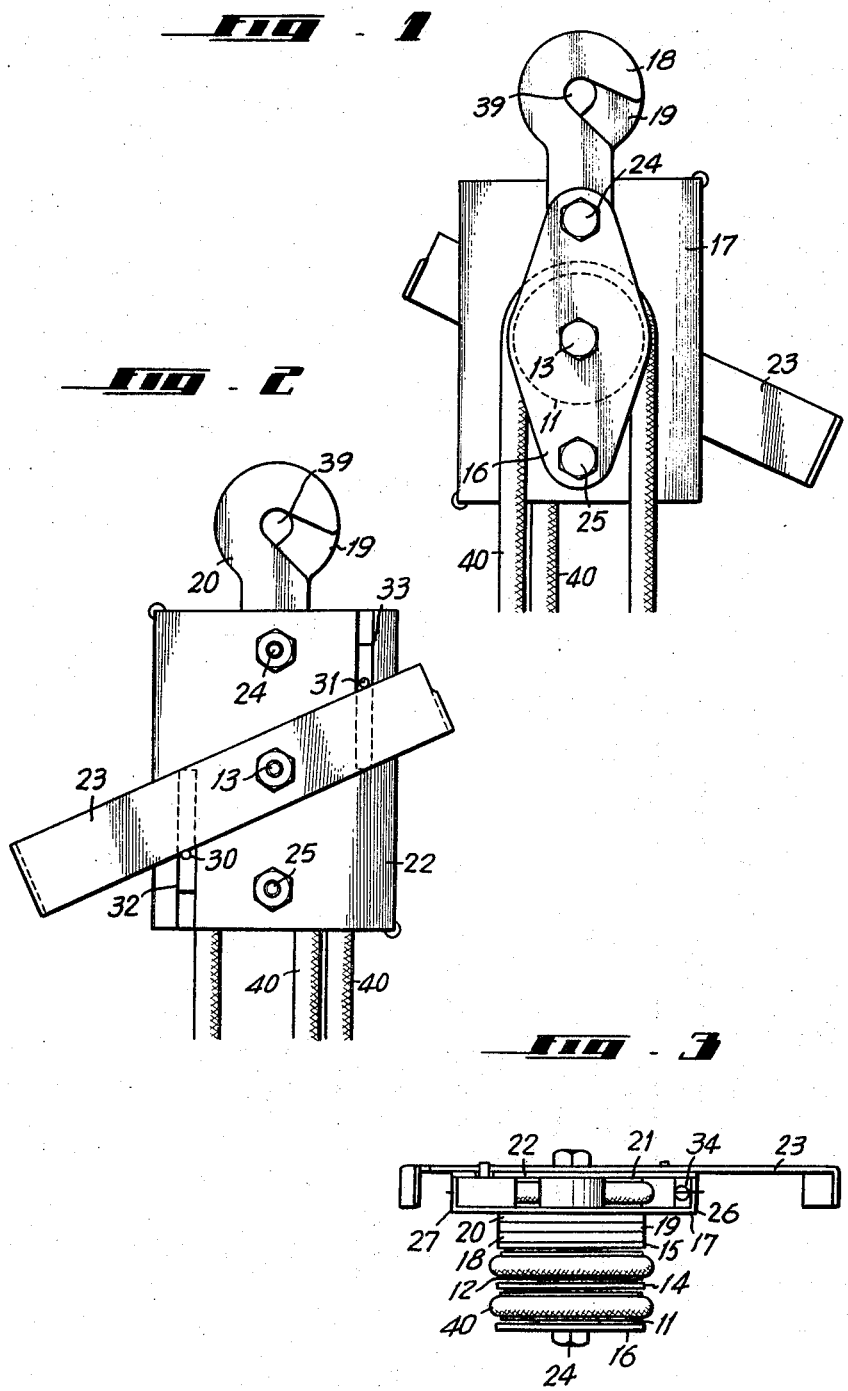

PATENTED SEP 4 1973 3,756,565

INVENTOR
HIDEO SAKAI
BY
Steinberg and Blake
ATTORNEYS

PULLEY BLOCK WITH BRAKE

BACKGROUND OF THE INVENTION

The present invention relates to pulley blocks.

In particular, the present invention relates to that type of pulley block which is provided with a brake for gripping the rope, cable, or the like, to prevent a load from falling.

The present invention is particularly designed for portable pulley blocks of relatively small size.

Such portable pulley blocks must be extremely compact and light. Therefore, conventional blocks of this type are not provided with a brake structure to prevent falling of a load which is released during hoisting thereof.

Relatively large pulley block assemblies, which occupy larger volumes, can easily accommodate suitable brake structures. However, if the brake structures of such relatively large assemblies are reduced in size, they still could not be incorporated into portable relatively light pulley blocks because the latter structures are not strong enough to accommodate such units. The smallest and simplest brake structures which can be incorporated into relatively small portable pulley blocks include stop members provided with pawls or teeth which engage the load-carrying rope in order to prevent reverse movement thereof when the load is released. Stop structures of this type are usually situated on one side of the pulleys, acting in such a way that when a load is raised the rope is permitted to move while if the load is released the pawls or teeth dig into the rope to prevent movement of the latter in the direction of falling movement of the load. Such conventional structures not only damage the rope but in addition they may actually cut completely through the rope. Conventional ropes, whether they are composed of Manila hemp, nylon, or other snythetic resins, have great resistance to tension but have a very poor resistance to localized compression, particularly when this compression is concentrated in an exceedingly small area with what amounts practically to a cutting action by the edge of a tooth. When pawls or other toothed components engage a rope to prevent the latter from moving in a direction which is opposite to the lifting direction, and when such pawls or teeth are sharpened at their edges which engage the rope, these components together with the weight of the load will tend to cut completely through the rope.

SUMMARY OF THE INVENTION

It is accordingly a primary object of the present invention to provide a pulley block assembly which will avoid the above drawbacks.

In particular, it is an object of the invention to provide a pulley block assembly with an automatic brake structure which will not damage an elongated flexible element such as a rope, cable, or the like.

Furthermore, it is an object of the present invention to provide a structure of this type which can readily be incorporated into a relatively small, light-weight assembly which is portable.

Also, it is an object of the present invention to provide a structure of this type which is exceedingly simple and inexpensive to manufacture and assemble while at the same time being completely reliable and achieving the required braking action without possibility of damaging the flexible load-carrying element.

Furthermore it is an object of the present invention to provide an assembly of this type with a manually operable structure which can be used, if required, to release the flexible element.

According to the invention the pulley block assembly includes a support means carrying a pin on which at least one pulley is freely rotatable with this latter pulley having an outer periphery at least one portion of which is at a greater radial distance from the pin than other portions of the outer periphery of the pulley. An elongated flexible member, for carrying the load, such as a rope, cable, or the like, is guided around the pulley. A wedge means is carried by the support means and coacts with the pulley, particularly the above-mentioned one portion of its outer periphery, for automatically gripping the flexible member between the periphery of the pulley and the wedge means when a load is released. This wedge means includes an elongated wedge member having a wedge surface adapted to engage the flexible member, and this wedge surface is smooth so that the flexible member will not be damaged when gripped between the pulley and the wedge means.

BRIEF DESCRIPTION OF DRAWINGS

The invention is illustrated by way of example in the accompanying drawings which form part of this application and in which:

FIGS. 1 and 2 are respectively front and rear elevations of a pulley block assembly according to the present invention;

FIG. 3 is a top plan view of the structure of FIG. 1;

DESCRIPTION OF PREFERRED EMBODIMENTS

Figure 4:
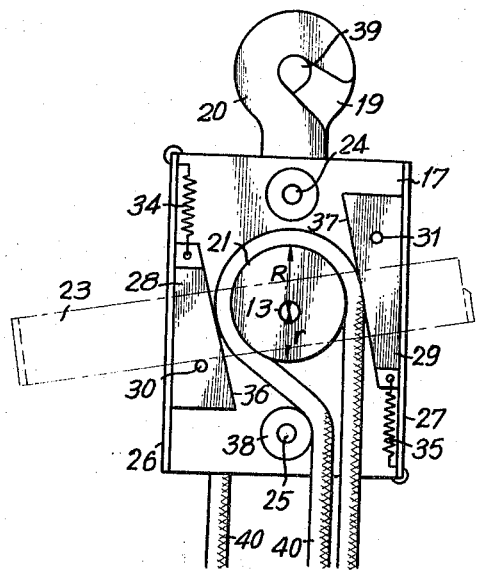
FIG. 4 illustrates the pulley block assembly of the invention in the same position as FIG. 2 but with the cover of a support means removed to show the structure behind this cover with FIG. 4 showing a manually operable means in phantom lines.

The structure of the invention which is illustrated in the drawings is relatively small and light so that it is portable. The structure includes a support means formed by a plate 17 made of any suitable metal, for example, and having a pair of side flanges 26 and 27 extending perpendicularly therefrom, as shown most clearly in FIG. 3. This support means carries an elongated pin 13 on which one or more pulleys are supported for rotary movement. In the illustrated example there are a pair of pulleys 11 and 12 supported for free rotary movement on the pin 13 and separated from each other by a washer 14. If additional pulleys are used then there are additional separating washers 14 situated between the additional pulleys. A second washer 15 is situated between the inner pulley 12 and the plate 17. Between the washer 15 and the plate 17, which is flat and has the configuration shown in FIG. 1, there are a plurality of hook elements 18-20 with the successive elements 18-20 having their hook portions directed oppositely one with respect to the next. The plate 17 together with the flanges 26 and 27 of the support means defines a space covered by a plate 22 and accommodating in its interior a wedge means which forms an automatic brake structure described below. The pin 13 which supports the pulleys for free rotary movement extends through the plates 17 and 22 as well as through a plate 16 which is shown in FIG. 1 spaced in front of the plate 17 so that the pulleys 11 and 12 are situated between the plates 16 and 17. The pin 13 may take the form of a bolt having a head engaging the plate 16 and having a threaded portion extending beyond the plate 22 and carrying the nut which is shown in FIG. 2 on the pin 13. A pair of additional bolts 24 and 25 extend through the plate 16 adjacent its opposed end regions, as shown in FIG. 1, and these bolts 24 and 25 also extend through the plates 17 and 22, carrying nuts which engage the plate 22, as shown in FIG. 2. Thus, these bolts 24 and 25, as well as the pin 13, serve to maintain all of the components assembled together. The bolts 24 and 25 are situated so that they will not interfere with movement of the elongated flexible member formed by the rope or cable 40 or with rotary movement of the pulleys.

The several hooks 18, 19, 20 are pivotally carried by the upper bolt 24 between the washer 15 and the plate 17 with the hooks 18 and 20 respectively located next to the washer 15 and the plate 17, as indicated in FIG. 3. The size of the several hooks 18–20 is such that they can swing through 180° about the pin 24 from the position shown in FIG. 1 into a position where the hook portions of the hooks will receive the pin 13. For this purpose the hooks 18 and 20 will be swung in a clockwise direction from the position of FIG. 1 while the hook 19 will be swung in a counterclockwise direction from the position of FIG. 1.

Figure 5:
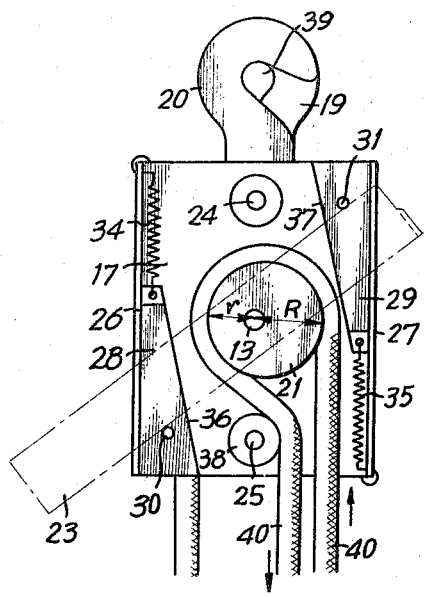
FIG. 5 shows the structure of FIG. 4 in the position which the parts take when the manually operable means has been actuated to release the flexible member.

Within the hollow interior space of the support means formed by plates 17 and 22, together with the flanges 26 and 27 of the plate 17, is a rotary pulley 21 shown most clearly in FIGS. 4 and 5. This pulley is also supported for free rotary movement by the pin 13. However, the pulley 21 has an outer periphery at least one portion of which is situated at a greater radial distance from the pin 13 than other portions of the outer periphery of the pulley 21. In the example illustrated in FIGS. 4 and 5 the pulley 21 has a circular outer periphery but is eccentrically mounted on the pin 13 so that the outer periphery of the pulley 21 has a portion situated at the radial distance R from the pin 13 which is considerably greater than the illustrated radial distance $r$. Therefore as the pulley 21 rotates, the portion of its outer periphery which is at the radius R from the pin 13 will rotate along a circle which is greater than the circle along which other portions of the outer periphery of the pulley rotate. Instead of an eccentric pulley of circular periphery it is also possible to use an elliptical or oval-shaped pulley.

When raising a load with pulley blocks of this type it is common to use a pair of pulley blocks carrying corresponding sets of pulleys around which the elongated flexible member 40 extends so as to have a plurality of loops respectively carried by corresponding pairs of pulleys on the pair of blocks, to achieve in this way the mechanical advantage of the pulley block arrangement. The flexible member 40 has a free end which is pulled by the operator so as to cause the lower pulley block which has a hook or the like carrying the load to be raised as the lengths of the loops between the pairs of pulleys become shorter. Thus, with the present invention at least one of the pulleys, preferably that of the upper block, has an outer periphery one portion of which is at a greater radial distance from the pin about which the pulley rotates than other portions of this outer periphery.

The automatic braking action achieved with the present invention is provided by a wedge means which includes a pair of elongated wedge members 28 and 29 situated within the space formed by the support means in slideable engagement with the flanges 26 and 27, these wedge members also slideably engaging the plates 17 and 22. Thus in the illustrated example the elongated wedge member 28 of the wedge means is guided for longitudinal movement by the flange 26 while the opposite wedge member 29 is guided for longitudinal movement by the flange 27. These wedge members have their narrow ends situated between the flanges and the pulley 21.

In order to limit the extent of movement of the wedge members 28 and 29, the wedge member 28 is provided with a pin 30 which is fixed to the wedge member 28 and projects therefrom through an elongated slot 32 formed in the plate 22, as indicated in FIG. 2. In the same way the wedge member 29 carries a pin 31 which extends through a slot 33 formed in the cover plate 22. Therefore the inner ends of these slots will engage the pins 30 and 31 to limit the extent of movement of the wedge members.

Although a pair of wedge members are provided in the illustrated embodiment of the invention to assure a prompt and positive braking action, the use of two wedges is not essential since only one wedge will serve the purpose. The wedges 28 and 29 are preferably made of Duracon (trademark of Celanese Corp. of America's acetal resin), or any equivalent material which has a good wear resistance. The wedge members 28 and 29 of the wedge means are respectively provided with inclined wedging surfaces 36 and 37 which are respectively directed toward the pulley 21, and the inclination of these wedging surfaces 36 and 37 is in accordance with the direction of rotation of the pulley 21 during hoisting of a load. In the example illustrated in FIGS. 4 and 5, the pulley 21 turns in a counterclockwise direction during raising of a load, so that in this case the wedge member 28 has its narrow end directed upwardly while the wedge member 29 has its narrow end directed downwardly.

The wedge means further includes a pair of springs 34 and 35 which are respectively connected with the smaller ends of the wedge members and with the flanges 26 and 27 so as to respectively urge the wedge members 28 and 29 upwardly and downwardly, as viewed in FIGS. 4 and 5. The elongated flexible member 40 is guided around the pulley 21 in the manner illustrated in FIGS. 4 and 5, and the springs 34 and 35 tend to maintain the wedging surfaces 36 and 37 in engagement with the flexible member 40, as illustrated in FIG. 4. Thus these surfaces 36 and 37 will normally be pressed against the flexible member 40 at a portion thereof which extends around the pulley 21, as illustrated in FIG. 4.

A manually operable means is provided for releasing the braking action provided by the wedge means, when necessary, and this manually operable means takes the form of a swingable lever 23 carried by the pin 13 for swinging movement thereon, this lever 23 being in the form of an elongated flat strip of relatively rigid metal or the like situated between the nut on the pin 13 and the wall 22 in engagement with the latter. This lever 23 extends between the pins 30 and 31 with the pin 30 situated below and the pin 31 situated above the lever 23, as viewed in FIGS. 4 and 5. Because of the action of the springs 34 and 35 on the wedge members 28 and 29, respectively, the pins 30 and 31 normally act on the lever 23 to urge the latter to turn in a clockwise direction about the pin 13, as viewed in FIGS. 4 and 5.

As may be seen from FIGS. 4 and 5, the lower assembly bolt 25 carries a bush or freely rotatable sleeve 38 around which a part of the flexible member 40 is guided. It is this part of the flexible member 40 which is pulled in a downward direction, as shown by the arrow in FIG. 5, during raising of a load, and of course at this time the part of the flexible member 40 which extends up to the pulley 21 will move upwardly.

When the several hook components 18–20 are swung up to their operative position, they cooperate to define an eye 39 through which extends the structure from which the pulley block is suspended.

Thus, when the above-described structure of the invention is to be used, a second pulley block having corresponding pulleys is situated below the illustrated pulley block, and the eccentric pulley 21 may be aligned with a conventional pulley which is supported for rotation at its center and which has a circular periphery. This lower, unillustrated pulley block will conventionally have a hook which carries the load which is to be hoisted. The flexible member 40 is wound into a given number of loops around the several pulleys in a well known manner. The hook components 18–20 are swung around a relatively strong supporting bracket, rope, chain, or the like, which is carried by a rigid robust structure on which the pulley block of the invention is supported during lifting of a load. The several hook components are closed to define the eye 39 from which the entire pulley block assembly is suspended.

As the rope 40 is pulled in the manner described above the load is hoisted. If the load is relatively light the operator will simply pull the rope 40 hand over hand and at each pull the load will be raised by a corresponding increment. Thus the load is raised with the mechanical advantage achieved by the particular number of loops and pulleys of the pulley blocks.

If during the lifting operation the operator releases the rope 40 with the load hoisted part of the way toward its final destination, and if the pulley block is of a conventional design which does not have a brake structure, the load will simply drop right back down without any substantial resistance to its falling movement. Therefore, in order to avoid such falling of the load it is essential for the operator to continue to pull the rope hand over hand until the load reaches its destination. Thus, where the pulley block does not have a brake structure, once the hoisting operation is started it must be continued until the load is raised to the desired elevation. Even then the operation cannot be terminated unless the free end of the rope is tied to a stationary structure capable of holding the load in its elevated condition. It is apparent, therefore, that such an operation produces a heavy physical burden on the operator.

In contrast, however, with the structure of the present invention the pulley 21 turns in a counterclockwise direction as the load is hoisted, as viewed in FIGS. 4 and 5, and thus the flexible member 40 is moved in such a way that it tends to displace the wedge elements 28 and 29 away from the pulley so that the rope can easily be pulled during hoisting of the load. Therefore, during raising of the load the flexible member 40 itself will easily overcome the forces of the springs 34 and 35 to maintain the wedge members 28 and 29 displaced from the pulley 21 by a distance sufficient to provide for free movement of the rope. Even though these wedge members may slideably engage the rope during raising of a load, the rope is nevertheless freely movable with practically no resistance.

If it happens that the operator reduces the pulling force after having pulled on the rope 40, the rope will begin to move slightly in a reverse direction because of the pull of the load. At this point, however, the wedge members 28 and 29 of the wedge means are urged to an increasing extent into the gaps between the pulley 21 and the flanges 26 and 27, by the springs 34 and 35, with the result that they compress the rope 40 forcefully between the periphery of the pulley 21, in a peripheral groove of the latter, and the inclined wedging surfaces 36 and 37. If instead of the pulley 21 a circular pulley is centrally carried by the pin 13, so that the periphery of the pulley concentrically surrounds the pin 13, then the braking action for positively holding the rope against movement in the load-falling direction is weak and the rope will slip in the peripheral groove of the pulley between the latter and the inclined wedging surfaces. In contrast, however, with the device of the present invention the pulley 21 has an outer peripheral portion at a greater radial distance from the pin 13 than other outer peripheral portions of the pulley so that while the pulley rotates its outer peripheral portion of maximum radius will engage the rope and contribute to the wedging action pressing the rope between this portion of maximum radius and at least one of the wedges. Thus as this peripheral portion of maximum radius moves along one of the inclined wedging surfaces of one of the wedges, it will cooperate with this latter wedging surface to compress the rope 40 very strongly between the pulley and the wedge member thus reliably preventing the load from falling.

Therefore, with the structure of the invention even if there is a reduction in the pulling force exerted by the operator, there is no danger that the load will fall. If the operator releases the rope, the load will remain suspended. If the operator slowly releases the flexible member 40 and the load is not extremely great, then the operator need only exert another pull on the rope in order to release the braking action of the wedge means and continue hoisting of the load, because under these conditions the compressive force exerted on the flexible member 40 by the eccentric pulley 21 and the wedges is relatively weak. However, if the operator suddenly releases the rope after the load has been at least partially raised the load will suddenly drop by a relatively small distance providing an instantaneous clamping of the rope between the pulley 21 and the wedges so that a relatively strong compression will result. Under these conditions the flexible member 40 may be compressed between the pulley 21 and the surfaces 36 and 37 to such an extent that it may be difficult to continue pulling on the rope since the latter will not be readily released from the braking force. The same situation will be encountered in the event that the load is relatively great so that even if the rope is gradually released the clamping action is strong. Under these conditions it is possible to resume hoisting of the load in an extremely simple manner by actuating the manually operable means 23. The operator need only turn the lever 23 in a counterclockwise direction about the pin 13, as viewed in FIGS. 4 and 5, so that in this way the lower and upper edges of the lever 23 will engage and displace the pins 30 and 31, respectively, downwardly and upwardly, to displace the wedge members 28 and 29 away from their wedging positions into positions such as those illustrated in FIG. 5 for the wedge members 28 and 29, respectively. The operator will turn the lever 23 with one hand to the position of FIG. 5 while holding the rope 40 with his other hand, and in this way the braking action is released and hoisting of the load can be safely resumed. The forces of the springs 34 and 35 are such that the operator can easily move the wedge members 28 and 29 in opposition to these springs, respectively, by turning of the lever 23 from the position of FIG. 4 into the position of FIG. 5, for example. Thus, the wedge members 28 and 29 are displaced out of pressure-engagement with the flexible member 40 which is released for continued raising of the load.

It is particularly to be noted that with the structure of the invention the wedging surfaces 36 and 37 are smooth and will not damage the flexible member 40. The braking action does not rely upon braking pawls or teeth which have sharp edges but rather only upon smooth surfaces such as the flat planar surfaces 36 and 37. Therefore without any damaging effect on the rope, the squeezing or clamping pressure in proportion to the magnitude of the load is exerted during the braking action achieved with the wedge means of the invention and with the periphery of the pulley 21, and no danger of reducing the life of the flexible member 40 by cutting fibers thereof, for example, is present.

Furthermore, while hand over hand operation has been referred to above, the pulley block of the invention can be used, where conditions warrant, in such a way that the rope is pulled with both hands, in the event that the load is great enough to require such operation. Therefore when raising a relatively heavy load it is possible for the operator to pull the load in increments with both hands so that a greater force can be applied. Of course, under these conditions after each pulling operation the load will be released while the operator raises his hands for the next pulling operation, but the structure of the invention will reliably hold the load in its raised condition so that with the structure of the invention instead of requiring constant pulling on the rope with hand over hand operation, a heavy load can be lifted with great ease in distinct increments where a much stronger pulling force is applied with both hands.

What is claimed is:

1. In a pulley-block assembly, support means, a pin carried by said support means, at least one pulley supported for rotary movement by said pin, said pulley having an outer periphery surrounding said pin and said outer periphery of said pulley having at least one portion situated at a greater radial distance from said pin than other portions of said outer periphery of said pulley, an elongated flexible member, such as a rope or cable, extending around said pulley and adapted to carry a load, and wedge means carried by said support means in a position frictionally engaging said flexible member during raising of a load and coacting with said one portion of said outer periphery of said pulley for automatically gripping said flexible member between said one portion of said outer periphery of said pulley and said wedge means when a load is released and said pulley rotates in one direction while said wedge means coacts with said pulley for releasing said flexible member for movement around said pin with said pulley while sliding along said wedge means when said flexible member is acted upon to raise a load and rotate said pulley in a direction opposite to said one direction.

2. The combination of claim 1 and wherein said flexible member has a portion extending between said outer periphery of said pulley and said wedge means, and the latter including at least one wedge member having a smooth wedging surface directed toward said pulley and defining with the latter a gap through which said flexible member extends so that when said wedge means grips said flexible member to compress the latter between said wedge means and pulley said flexible member will not be damaged.

3. The combination of claim 2 and wherein said surface of said wedge means is flat.

4. The combination of claim 1 and wherein a manually operable means is carried by said support means for coacting with said wedge means to displace the latter in a direction extending away from said flexible member for releasing said flexible member.

5. The combination of claim 1 and wherein said periphery of said pulley is circular and said pulley is eccentrically mounted on said pin.

6. The combination of claim 1 and wherein said wedge means includes at least one wedge member and a spring connecting said wedge member to said support means for urging said wedge member in a direction which will automatically grip said flexible member between said pulley and wedge member when a load is released and said pulley rotates in said one direction.

7. The combination of claim 1 and wherein said support means includes a plate and at least one flange extending perpendicularly from said plate, said pin extending perpendicularly with respect to said plate and said pulley being supported for rotary movement on said pin with the periphery of said pulley directed toward said flange, said wedge means including an elongated wedge member slideably engaging said flange and situated between the latter and said pulley, and said flexible member extending between said pulley and said wedge member, the latter having an inclined surface directed toward said flexible member and pulley for coacting with said flexible member to grip the latter between said pulley and wedge member when a load is released while said wedge member is freely slideable along said flange.

8. The combination of claim 7 and wherein a spring is connected to said support means and one end of said wedge member for urging the latter in a wedging direction along said flange.

9. In a pulley-block assembly, support means, a pin carried by said support means, at least one pulley supported for rotary movement by said pin, said pulley having an outer periphery surrounding said pin and said outer periphery of said pulley having at least one portion situated at a greater radial distance from said pin than other portions of said outer periphery of said pulley, an elongated flexible member, such as a rope or cable, extending around said pulley and adapted to carry a load, and wedge means carried by said support means and coacting with said one portion of said outer periphery of said pulley for automatically gripping said flexible member between said one portion of said outer periphery of said pulley and said wedge means when a load is released while said wedge means coacts with said pulley for releasing said flexible member for movement around said pin with said pulley when said flexible member is acted upon to raise a load, said support means including a plate and at least one flange extending perpendicularly from said plate, said pin extending peripendicularly with respect to said plate and said pulley being supported for rotary movement on said pin with the periphery of said pulley directed toward said flange, said wedge means including an elongated wedge member slideably engaging said flange and situated between the latter and said pulley, and said flexible member extending between said pulley and said wedge member, the latter having an inclined surface directed toward said flexible member and pulley for coacting with said flexible member to grip the latter between said pulley and wedge member when a load is released while said wedge member is freely slidable along said flange, a spring connected to said support means and one end of said wedge member for urging the latter in a wedging direction along said flange, said plate being formed with a slot extending parallel to said flange, a release pin fixed to said wedge member and extending through said slot, and a release lever turnably carried by said pin at the side of said plate opposite from said pulley and adapted to engage said release pin when said lever is swung for displacing said wedge member in a direction which will release said flexible member.

10. The combination of claim 9 and wherein said plate has a pair of said flanges and a pair of oppositely directed wedge members between which said pulley and flexible member are located with said wedge members respectively being slideable along said flanges, said plate having a pair of slots and both of said wedge members carrying release pins which respectively extend through said slots with said one lever being situated between said release pins for engaging them simultaneously for simultaneously releasing both wedge members.

* * * * *